(12) United States Patent
Aoyama et al.

(10) Patent No.: US 12,151,298 B2
(45) Date of Patent: Nov. 26, 2024

(54) MANUFACTURING METHOD FOR JOINED BODY, WELDING METAL BODY, AND JOINING ELEMENT

(71) Applicant: Ahresty Corporation, Toyohashi (JP)

(72) Inventors: Shunzo Aoyama, Toyohashi (JP); Yoshiteru Kondo, Toyohashi (JP)

(73) Assignee: AHRESTY CORPORATION, Toyohashi (JP)

( * ) Notice: Subject to any disclaimer, the term of this patent is extended or adjusted under 35 U.S.C. 154(b) by 554 days.

(21) Appl. No.: 17/391,223

(22) Filed: Aug. 2, 2021

(65) Prior Publication Data

US 2022/0040781 A1 Feb. 10, 2022

(30) Foreign Application Priority Data

Aug. 7, 2020 (JP) ................................. 2020-134665

(51) Int. Cl.
*B23K 11/20* (2006.01)
*B23K 11/11* (2006.01)
*B23K 11/34* (2006.01)
*B23K 103/20* (2006.01)

(52) U.S. Cl.
CPC ............ *B23K 11/20* (2013.01); *B23K 11/115* (2013.01); *B23K 11/34* (2013.01); *B23K 2103/20* (2018.08)

(58) Field of Classification Search
CPC ...... B21J 15/025; B23K 11/115; B23K 11/20; B23K 11/34; B23K 2103/20
USPC ........................................................ 219/118
See application file for complete search history.

(56) References Cited

U.S. PATENT DOCUMENTS

2016/0167158 A1* 6/2016 Spinella ................. B23K 11/20
403/270
2017/0216956 A1* 8/2017 Kotschote ................. F16B 5/04

FOREIGN PATENT DOCUMENTS

JP 2017-87281 A 5/2017
JP 2018-126752 A 8/2018

OTHER PUBLICATIONS

Office Action dated Oct. 10, 2023, issued in counterpart JP Application No. 2020-134665, with English translation. (8 pages).

* cited by examiner

*Primary Examiner* — Dana Ross
*Assistant Examiner* — Joseph W Iskra
(74) *Attorney, Agent, or Firm* — WHDA, LLP

(57) ABSTRACT

A manufacturing method for joined bodies that allows galvanic corrosion to be reduced is provided. The method is for manufacturing a joined body obtained by joining together a mating member made of ferrous metal and a non-ferrous metal material. The method includes: a press fit step of press-fitting a joining element made of ferrous metal into a predetermined surface of the non-ferrous metal material; and a welding step of forming a melted portion between an exposed portion of the joining element press-fitted into the non-ferrous metal material and the mating member. After the press fit step, a part of the joining element is exposed from the predetermined surface and the remaining part of the joining element is not exposed and is buried in the non-ferrous metal material. The remaining part of the joining element includes a lodging portion having a surface facing to the predetermined surface.

9 Claims, 10 Drawing Sheets

MANUFACTURING METHOD FOR JOINED BODY, WELDING METAL BODY, AND JOINING ELEMENT

BACKGROUND OF THE INVENTION

Field of the Invention

The present invention relates to a manufacturing method for joined bodies, a welding metal body, and a joining element which allow galvanic corrosion to be reduced.

Description of Related Art

Such a non-ferrous metal material as aluminum, magnesium, and zinc, for example, is difficult to weld directly to a mating member formed from a ferrous metal material (steel). Consequently, techniques of joining a joining element made of ferrous metal to a non-ferrous metal material by any other method than welding and welding the joining element and a mating member together are conventionally known. One of such techniques is to plunge and push a joining element made of ferrous metal into a back surface of a non-ferrous metal material opposite its surface facing to a mating member and weld the joining element that penetrated the non-ferrous metal material to its surface to the mating member resistance spot welding (Patent Document 1).

PRIOR ART DOCUMENT

Patent Document

[Patent Document 1] Japanese Unexamined Patent Application Publication No. 2017-87281

SUMMARY OF THE INVENTION

However, in the above-mentioned conventional techniques, an area of a joining element made of ferrous metal located on the opposite side to an area welded to a mating member is exposed from the back surface of a non-ferrous metal material. For this reason, on the back surface side of the non-ferrous metal material, measures need be taken against galvanic corrosion between the non-ferrous metal material and the joining element. The measures incur a problem of increase in a number of operation processes or a cost.

The present invention has been made to solve the above problem and it is an object of the present invention to provide a manufacturing method for joined bodies, a welding metal body, and a joining element which allow galvanic corrosion to be reduced.

To achieve the above object, a manufacturing method for joined bodies according to the present invention is to manufacture a joined body obtained by joining together a mating member made of ferrous metal and a non-ferrous metal material including a predetermined surface facing to the mating member. The manufacturing method for joined bodies includes: a press fit step of press-fitting the joining element made of ferrous metal into the predetermined surface of the non-ferrous metal material; and a welding step of forming a melted portion between an exposed part of the joining element press-fitted into the non-ferrous metal material and the mating member. After the press fit step, a part of the joining element is exposed from the predetermined surface and the remaining part of the joining element is not exposed and is buried in the non-ferrous metal material. The remaining part of the joining element includes at least one lodging portion having a surface facing to the predetermined surface.

A welding metal body according to the present invention includes: a non-ferrous metal material including a predetermined surface; and at least one joining element made of low-carbon steel of a carbon content of 0.4 mass % or less. The joining element is press-fitted into the predetermined surface so that a part of the joining element is exposed from the predetermined surface and the remaining part of the joining element is not exposed and is buried in the non-ferrous metal material. The remaining part of the joining element includes at least one lodging portion having a surface facing to the predetermined surface.

A joining element according to the present invention is made of ferrous metal and is press-fitted into a predetermined surface of a non-ferrous metal material and welded to a mating member made of ferrous metal. The joining element includes: a body portion having a joining surface formed as a flat surface orthogonal to a virtual axis and an outer peripheral surface continuing to an outer peripheral edge of the joining surface and encircling the virtual axis; and at least one leg portion having an outer surface continuing to an outer peripheral surface and protruded from the opposite side of the body portion to the joining surface so as to be positioned around a virtual axis. The outer peripheral surface is formed of at least one of a parallel portion parallel to the virtual axis in a cross section including the virtual axis and an inclined portion that is brought away from the virtual axis as it goes away from the joining surface.

According to a manufacturing method for joined bodies in a first aspect, at the press fit step, a joining element is press-fitted into a predetermined surface of a non-ferrous metal material. With respect to a part of the joining element buried in the non-ferrous metal material, a lodging portion has a surface facing to the predetermined surface; therefore, the joining element can be made less prone to come out of the non-ferrous metal material.

After the press fit step, a part of the joining element is exposed from the predetermined surface and the welding step is performed to form a melted portion between that part and a mating member, a joined body being thereby manufactured. Since the remaining part of the joining element is not exposed and is buried in the non-ferrous metal material, galvanic corrosion can be reduced.

According to a manufacturing method for joined bodies in a second aspect, at a heating step, of a non-ferrous metal material prior to a press fit step, an area where a joining element is to be press-fitted at the press fit step is heated. As a result, the joining element is press-fitted to the area of the non-ferrous metal material whose ductility is enhanced by the heating step. Therefore, in addition to the effect brought about by the first aspect, the non-ferrous metal material with the joining element press-fitted can be made less prone to crack.

According to a welding metal body in a third aspect, a joining element is press-fitted into a predetermined surface of a non-ferrous metal material. In the joining element, with respect to a part buried in the non-ferrous metal material, a lodging portion has a surface facing to the predetermined surface; therefore, the joining element can be made less prone to come out of the non-ferrous metal material. Since a part of the joining element is exposed from the predetermined surface of the non-ferrous metal material, a mating member can be welded to that part. Since the remaining part of the joining element is not exposed and is buried in the non-ferrous metal material, galvanic corrosion can be reduced.

Further, the joining element is formed of a material suitable for welding, such as low-carbon steel of a carbon content of 0.4 mass % or less. As a result, the joining element can be prevented from being made too hard and fragile due to a heat affection of welding between the mating member and the joining element. As a result, in the joining element, weld cracking and reduction in toughness caused by hardening during welding can be suppressed. Therefore, the strength of bonding between the mating member and the non-ferrous metal material via the joining element can be ensured.

According to a joining element in a fourth aspect, a leg portion protruded from the opposite side of a body portion to a joining surface is positioned around a virtual axis orthogonal to the joining surface. Depending on the dimension setting of the joining element or a non-ferrous metal material or the like, the joining element can be press-fitted from the leg portion into a predetermined surface of the non-ferrous metal material by pressing the joining surface. Thus, the joining element is press-fitted into the non-ferrous metal material without the joining element's penetration through the non-ferrous metal material. As a result, while the joining surface to be welded to a mating member can be exposed from the non-ferrous metal material, the leg portion or the back surface of the body portion can be prevented from being exposed from the non-ferrous metal material. For this reason, in what is obtained by press-fitting the joining element into the non-ferrous metal material, galvanic corrosion can be reduced.

An outer peripheral surface is formed of at least one of a parallel portion that is parallel to a virtual axis in a cross section including the virtual axis and an inclined portion that is brought away from the virtual axis as it goes away from the joining surface. The leg portion having an outer surface continuing to the outer peripheral surface is protruded from the body portion. The joining element can be more easily press-fitted into the predetermined surface of the non-ferrous metal material up to the body portion as compared with cases where the body portion is provided with a flange widened outward from the outer surface of the leg portion.

According to a joining element in a fifth aspect, an outer peripheral surface in a position to which an outer surface of a leg portion continues includes an inclined portion continuing to an outer peripheral edge of a joining surface. As a result, when the joining element is press-fitted into a non-ferrous metal material from the leg portion by pressing the joining surface, a swelling deformation of the body portion under pressure by the leg portion can be absorbed by a deformation of the inclined portion being made near flush with the joining surface. As a result, the joining surface of the joining element press-fitted into the non-ferrous metal material can be easily brought into surface contact with a mating member. Therefore, in addition to the effect brought about by the fourth aspect, weld strength between the joining element and the mating member can be enhanced.

According to a joining element in a sixth aspect, a body portion has a back surface that is located on the opposite side to a joining surface and extends from a leg portion toward a virtual axis. A boundary between an inclined portion and the joining surface is located in a position farther from the virtual axis than a boundary between the back surface of the body portion and the leg portion is. As a result, when the joining element is press-fitted into a non-ferrous metal material from the leg portion by pressing the joining surface, the joining surface can be pressed in a position on an extension of the leg portion in the axial direction of the virtual axis. Consequently, in addition to the effect brought about by the fifth aspect, the body portion of the joining element press-fitted into the non-ferrous metal material can be made less prone to collapse inside the leg portion.

According to a joining element in a seventh aspect, a leg portion is formed in the shape of a cylinder encircling a virtual axis from all around the virtual axis. For this reason, when the joining element is press-fitted into a non-ferrous metal material from the leg portion, air may remain between a body portion and the non-ferrous metal material inside the leg portion. However, since a through hole open in at least one of a joining surface and an outer peripheral surface of the body portion and an outer surface of the leg portion communicates to inside the leg portion, air is less prone to remain between the body portion and the non-ferrous metal material after press-fitting. As a result, when a mating member applied to the joining surface and the joining element are welded together, heat transfer from the joining element to the non-ferrous metal material is less prone to be hindered by air between the body portion and the non-ferrous metal material. Consequently, the joining element is stably cooled during welding and the shape and size of a melted portion between the joining element and the mating member are stabilized. As a result, in addition to the effect brought about by the fourth aspect, weld strength between the joining element and the mating member can be enhanced.

According to a joining element in an eighth aspect, a leg portion is formed in the shape of a cylinder encircling a virtual axis from all around the virtual axis; and a back surface of a body portion located on the opposite side to a joining surface extends from the leg portion toward the virtual axis. For this reason, when the joining element is press-fitted into a non-ferrous metal material from the leg portion, air may remain between the back surface of the body portion and the non-ferrous metal material inside the leg portion. However, since at least a part of the back surface of the body portion is formed in the shape of a convexity, air collects between a peripheral portion of the convexity and the non-ferrous metal material and a central portion of the convexity is prone to be brought into tight contact with the non-ferrous metal material. As a result, when a mating member applied to the joining surface and the joining element are welded together, heat transfer from the joining element to the non-ferrous metal material is facilitated. Consequently, the joining element is stably cooled during welding and the shape and size of a melted portion between the joining element and the mating member are stabilized. As a result, in addition to the effect brought about by the fourth aspect, weld strength between the joining element and the mating member can be enhanced.

According to a joining element in a ninth aspect, a leg portion is in the shape of a cylinder encircling a virtual axis; therefore, the rigidity of the leg portion can be made substantially uniform in the circumferential direction and further, the rigidity of the leg portion can be ensured in the axial direction of the virtual axis. As a result, when the joining element is press-fitted into a non-ferrous metal material from the leg portion by pressing a joining surface, the leg portion can be made less susceptible to buckling and rupture and the leg portion can be caused to dig into the non-ferrous metal material with reliability. Consequently, in addition to the effect brought about by the fourth aspect, bonding strength between the non-ferrous metal material and the joining element can be ensured.

DETAILED DESCRIPTION OF THE PREFERRED EMBODIMENTS

Figure 1:
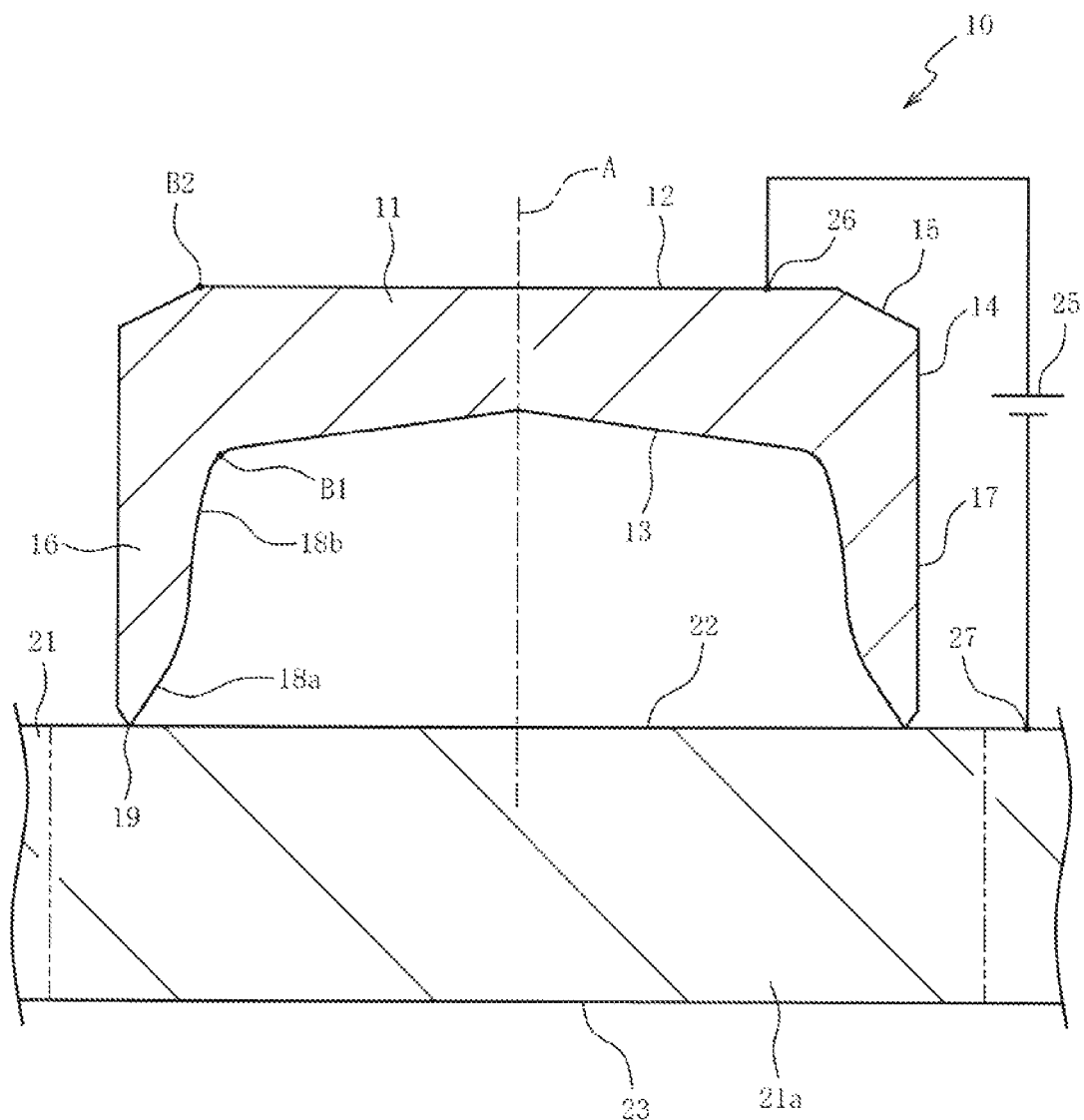
FIG. 1 is a cross-sectional view of a joining element and a non-ferrous metal material in a first embodiment.

Hereafter, a description will be given to preferred embodiments of the present invention with reference to the accompanying drawings. First, a description will be given to a joining element 10 and a non-ferrous metal material 21 into which the joining element 10 is press-fitted with reference to FIG. 1. FIG. 1 is a cross-sectional view of the joining element 10 and the non-ferrous metal material 21. The joining element 10 is a member for joining together the non-ferrous metal material 21 and a mating member 2 (refer to FIG. 3) formed of different types of metal. Though a detailed description will be given later with reference to FIG. 3, the joining element 10 is press-fitted into the non-ferrous metal material 21 and then welded to the mating member 2 to form a joined body 1.

The joining element 10 is made of ferrous metal. In the present embodiment, the joining element 10 is formed of low-carbon steel. The low-carbon steel is a steel with a carbon content of 0.4 mass % or less. A carbon content of the low-carbon steel is preferably 0.2 mass % or less. Examples of the low-carbon steel include S15C steel and SS400 steel.

The joining element 10 includes a disk-shaped body portion 11 and a cylindrical leg portion 16 protruded from the body portion 11 and these portions are integrally formed. The joining element 10 is formed to be in axial symmetry with respect to a virtual axis A. FIG. 1 shows a cross section including the virtual axis A.

The body portion 11 includes: a joining surface 12; a back surface 13 located on the opposite side to the joining surface 12; and an outer peripheral surface continuing to an outer peripheral edge of the joining surface 12 and encircling the back surface 13. The virtual axis A runs through the center of the circular joining surface 12 and the joining surface 12 is formed as a flat surface orthogonal to the virtual axis A. The outer peripheral surface of the body portion 11 encircles the virtual axis A. The back surface 13 is formed in the shape of a concavity recessed toward the joining surface 12 as it goes toward the radial center (virtual axis A).

The outer peripheral surface of the body portion 11 is formed of: a parallel portion 14 parallel to the virtual axis A in a cross section including the virtual axis A; and an inclined portion 15 brought away from the virtual axis A as it goes away from the joining surface 12. The inclined portion 15 continues to the entire circumference of an outer peripheral edge of the joining surface 12. The parallel portion 14 continues to the entire circumference of an edge of the inclined portion 15 on the back surface 13 side.

The leg portion 16 is an area protruded from the periphery side of the back surface 13 of the body portion 11 and is formed in the shape of a cylinder centered on the virtual axis A. The back surface 13 is extended from an upper end of the leg portion 16 inward in the radial direction (toward the virtual axis A). Since the leg portion 16 is in a cylindrical shape, formation of the joining element 10 by heading is facilitated. Since the inside of the leg portion 16 is hollow, the joining element 10 can be reduced in weight as compared with cases where the inside of the leg portion 16 is solid even though the joining surface 12 is enlarged. An outer peripheral surface (outer surface) 17 of the leg portion 16 continues to the entire circumference of the parallel portion 14 (outer peripheral surface) of the body portion 11. The outer peripheral surface 17 is parallel to the virtual axis A in a cross section including the virtual axis A and is linearly formed together with the parallel portion 14.

An inner circumferential surface of the leg portion 16 is gradually increased in diameter as it goes toward a tip 19 of the leg portion 16 at a distance from the body portion 11. The inner circumferential surface of the leg portion 16 includes: a tip inner surface 18a continuing to the entire circumference of the annular tip 19; and a base inner surface 18b coupling the entire circumference of the tip inner surface 18a with the back surface 13 of the body portion 11. The tip inner surface 18a is larger than the base inner surface 18b in angle of inclination to the virtual axis A in a cross section including the virtual axis A.

When in a cross section including the virtual axis A, the inner circumferential surface (base inner surface 18b) of the leg portion 16 and the back surface 13 are connected with each other by a curve, a position where an angle formed by a tangent of the curve and the virtual axis A is 45 degrees is taken as a boundary B1 between the leg portion 16 and the back surface 13 of the body portion 11. A boundary B2 between the inclined portion 15 and the joining surface 12 (the outer peripheral edge of the joining surface 12) is located in a position farther from the virtual axis A than the boundary B1 is. That is, a part of the joining surface 12 is located in a position on an extension of the leg portion 16 in the direction of the virtual axis A.

The non-ferrous metal material 21 is a member made of non-ferrous metal, such as aluminum, magnesium, zinc, or an alloy containing any of these metals as a principal component, especially difficult to weld to ferrous metal. In the present embodiment, the non-ferrous metal material 21 is a casting made of an aluminum alloy and a part into which the joining element 10 is to be press-fitted is formed into a plate. The non-ferrous metal material 21 includes: a front surface (predetermined surface) 22 into which the joining element 10 is press-fitted; and a back surface 23 located on the opposite side to the front surface 22 in the direction of plate thickness. Before the joining element 10 is press-fitted, the non-ferrous metal material 21 is formed to be substantially constant in thickness.

Figure 2:
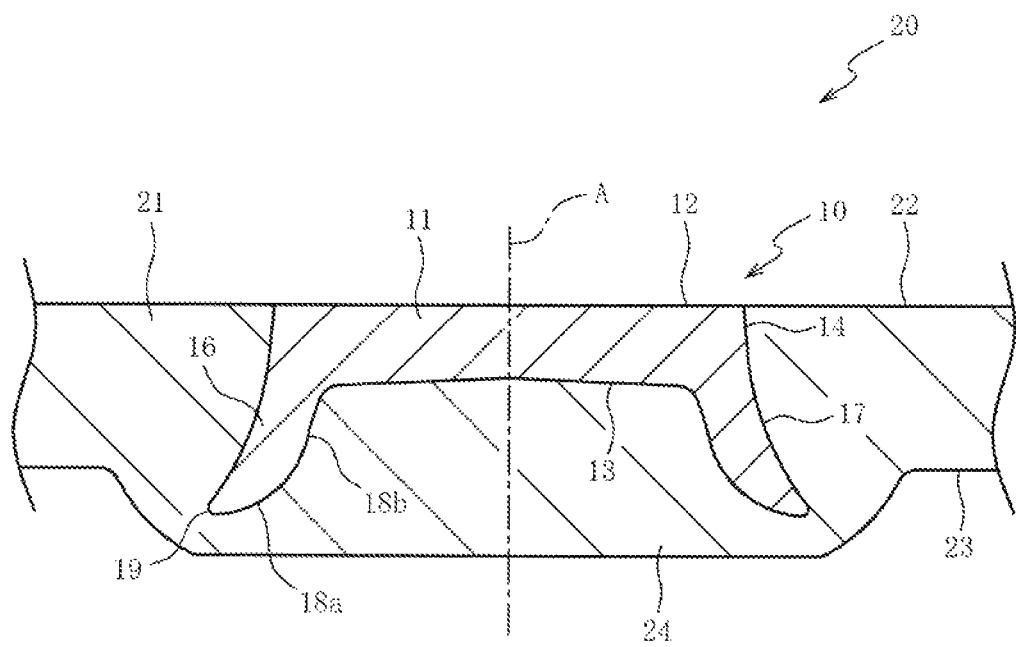
FIG. 2 is a cross-sectional view of a welding metal body obtained by press-fitting a joining element into a non-ferrous metal material.

A description will be given to a step of press-fitting the joining element 10 into the non-ferrous metal material 21 to form a welding metal body 20 with reference to FIG. 1 and FIG. 2. FIG. 2 is a cross-sectional view of the welding metal body 20. FIG. 2 shows a cross section including the virtual axis A as FIG. 1 does. By press-fitting the joining element 10 shown in FIG. 1 into the front surface 22 of the non-ferrous metal material 21, the welding metal body 20 shown in FIG. 2 is formed.

To press-fit the joining element 10, specifically, first, the non-ferrous metal material 21 is clamped between a die (not shown) in contact with the back surface 23 and a cylindrical clamper (material holder, not shown) in contact with the front surface 22. Subsequently, the parallel portion 14 and the outer peripheral surface 17 of the joining element 10 slide on an inner circumferential surface of the clamper to set the joining element 10 in the clamper so that the tip 19 of the leg portion 16 of the joining element 10 hits against the front surface 22.

In this state, the front surface 22 is a plane perpendicular to the virtual axis A and the clamper is in the shape of a cylinder centered on the virtual axis A. By pressing the joining surface 12 with a punch (not shown) sliding in the clamper in the direction of the virtual axis A, the joining element 10 is press-fitted into the non-ferrous metal material 21 from the leg portion 16 without the joining element 10's penetration through the non-ferrous metal material 21. While a part of the joining element 10 including the joining surface 12 is exposed from the non-ferrous metal material 21, the remaining part of the joining element 10 (an area of the joining element 10 other than the part exposed from the non-ferrous metal material 21) is so buried as not to be exposed from the non-ferrous metal material 21. Thus, the welding metal body 20 is formed.

Depending on the material of the non-ferrous metal material 21, the non-ferrous metal material 21 may crack when the joining element 10 is press-fitted into the non-ferrous metal material 21. To reduce this cracking, in general, the entire non-ferrous metal material 21 is heat-treated to modify the metallographic structure and the like and enhance the ductility of the non-ferrous metal material 21. Even though without a heat treatment, cracking is also reduced during press-fitting by adopting a material less prone to crack during press-fitting for the non-ferrous metal material 21.

In the present embodiment, unlike these methods, of the non-ferrous metal material 21 prior to press-fitting of the joining element 10, a portion into which the joining element 10 is to be press-fitted is preheated to form a high-ductility portion 21*a*. As a result, the non-ferrous metal material 21 can be made less prone to crack when the joining element 10 is press-fitted without heat-treating the entire non-ferrous metal material 21. The area in FIG. 1 between alternate long and two short dashes line and the virtual axis A is the high-ductility portion 21*a*.

To form the high-ductility portion 21*a*, for example, first, the tip 19 of the joining element 10 is applied to the front surface 22 of the non-ferrous metal material 21 and electrodes 26, 27 leading to a power source 25 are respectively connected to the joining element 10 and the non-ferrous metal material 21. Electricity is let to flow between the electrodes 26 and 27 to generate convergence resistance in the vicinity of the tip 19 and a part of the non-ferrous metal material 21 is resistance-heated by the convergence resistance. By performing resistance heating to a temperature at which the part of the non-ferrous metal material 21 is softened, the high-ductility portion 21*a* is formed. Thus, the part of the non-ferrous metal material 21 clamped between the die and the clamper is softened to form the high-ductility portion 21*a* and the joining element 10 is press-fitted into the high-ductility portion 21*a*. As a result, the high-ductility portion 21*a* can be made less prone to crack.

Aside from resistance heating, methods for heating a part of the non-ferrous metal material 21 include laser heating and electromagnetic induction heating, optical heating using halogen light or the like, contact heating by contact with a high-temperature medium, and the like. The high-ductility portion 21*a* is not limited to an area softened at a high temperature and may be an area whose ductility has been enhanced by a modification in metallographic structure due to heating and cooling. According to a material of the non-ferrous metal material 21, a part into which the joining element 10 is press-fitted could be heated at an appropriate temperature or cooled after heating to form the high-ductility portion 21*a*. Thus, a degree of freedom in selecting a material of the non-ferrous metal material 21 can be enhanced.

In the welding metal body 20, as shown in FIG. 2, the joining element 10 is press-fitted into the non-ferrous metal material 21 so that the joining surface 12 and the front surface 22 are flush with each other. In the present specification, that the joining surface 12 and the front surface 22 are flush with each other means that a lift of the joining surface 12 from the front surface 22 is 1 mm or less.

In the welding metal body 20, the back surface 23 of the non-ferrous metal material 21 in the position where the joining element 10 was press-fitted is swelled relative to the surroundings and a covering portion 24 is formed in the non-ferrous metal material 21 by the swelled portion. In the die, a recess larger in diameter than an outside diameter of the joining element 10 is formed. This recess is filled by the non-ferrous metal material 21 extruded by press-fitting of the joining element 10 and as a result, the covering portion 24 is formed. A part of the joining element 10 including the joining surface 12 is exposed from the front surface 22 of the non-ferrous metal material 21. The covering portion 24 covers the back surface 13 and leg portion 16 of the joining element 10 to prevent the remaining part of the joining element 10 from being exposed from the back surface 23 of the non-ferrous metal material 21. The back surface 23 at the covering portion 24 is a plane perpendicular to the virtual axis A, that is, a plane parallel to the joining surface 12 and the front surface 22.

The tip inner surface 18*a* and base inner surface 18*b* of the leg portion 16 prior to press-fitting shown in FIG. 1 are gradually increased in diameter as they go toward the tip 19; therefore, during press-fitting of the joining element 10, radially outward force is applied from the non-ferrous metal material 21 to the leg portion 16. For this reason, in the welding metal body 20 shown in FIG. 2, the leg portion 16 buried in the non-ferrous metal material 21 is plastically deformed so that the outer peripheral surface 17 is curved (inclined) outward in the radial direction as it goes toward the tip 19. Since a lodging portion including the outer peripheral surface 17 facing to the front surface 22 of the non-ferrous metal material 21 is formed by the leg portion 16, the joining element 10 can be made less prone to come out of the non-ferrous metal material 21. The outer peripheral surface 17 facing to the front surface 22 in the lodging portion only has to even slightly face to the front surface 22, so when an attempt is made to remove the joining element 10 from the front surface 22 side of the non-ferrous metal material 21, the outer peripheral surface 17 is lodged in the non-ferrous metal material 21. For example, even when an angle of inclination of the outer peripheral surface 17 to the virtual axis A is approximately 1° in a cross section including the virtual axis A, the outer peripheral surface 17 may be considered to face to the front surface 22.

In a cross section including the virtual axis A, an angle of inclination of the tip inner surface 18a to the virtual axis A is larger than an angle of inclination of the base inner surface 18b to the virtual axis A. For this reason, while a thickness of the leg portion 16 in the base inner surface 18b can be ensured to ensure the rigidity of the leg portion 16, the tip 19 of the leg portion 16 tapered by the tip inner surface 18a can be made easily dig into the non-ferrous metal material 21. Further, since the leg portion 16 is in the shape of a cylinder encircling the virtual axis A, the rigidity of the leg portion 16 can be made substantially uniform in the circumferential direction and the rigidity of the leg portion 16 can be ensured in the direction of the virtual axis A. As a result, when the joining element 10 is press-fitted into the non-ferrous metal material 21 from the leg portion 16 by pressing the joining surface 12, the leg portion 16 can be made less susceptible to buckling and rupture and the leg portion 16 can be made dig into the non-ferrous metal material 21 with reliability. Consequently, bonding strength between the non-ferrous metal material 21 and the joining element 10 can be ensured.

A Vickers hardness of a material of the joining element 10 conforming to JIS Z2244:2009 (ISO 6507-1 and ISO 6507-4) is set to 310 to 370HV10 suitable for press-fitting into the non-ferrous metal material 21 made of an aluminum alloy. When a Vickers hardness of the joining element 10 is within this range, the leg portion 16 can be made dig into the non-ferrous metal material 21 as a casting made of an aluminum alloy without causing buckling of the leg portion 16; and further, the leg portion 16 can be sufficiently plastically deformed outward in the radial direction in the non-ferrous metal material 21 during press-fitting.

The space inside the leg portion 16 of the joining element 10 is almost entirely filled with the non-ferrous metal material 21. As a result, the leg portion 16 plastically deformed outward in the radial direction is less prone to deform and come back inward in the radial direction. For this reason, bonding strength between the non-ferrous metal material 21 and the joining element 10 due to the leg portion 16 widened outward in the radial direction can be ensured.

An outer peripheral surface of the body portion 11 of the joining element 10 prior to press-fitting shown in FIG. 1 is formed of the parallel portion 14 and the inclined portion 15 and is free from an inclined surface brought toward the virtual axis A as it goes away form the joining surface 12. In addition, the leg portion 16 including the outer peripheral surface 17 continuing to this outer peripheral surface (parallel portion 14) of the body portion 11 is protruded from the back surface 13 of the body portion 11. As the result of the foregoing, the joining element 10 can be more easily press-fitted into the front surface 22 of the non-ferrous metal material 21 up to the body portion 11 as compared with cases where the body portion 11 is provided with a flange widened outward from the outer peripheral surface 17 of the leg portion 16.

When the joining element 10 is press-fitted into the non-ferrous metal material 21 from the leg portion 16 by pressing the joining surface 12, reaction force in the direction of the virtual axis A from the leg portion 16 is applied to the body portion 11. For this reason, the body portion 11 is pressed by the leg portion 16 and an outer peripheral edge of the joining surface 12 becomes about to swell and get into between the punch and the clamper. However, the outer peripheral surface of the body portion 11 in a position to which the outer peripheral surface 17 of the leg portion 16 continues includes the inclined portion 15 continuing to the outer peripheral edge of the joining surface 12. For this reason, the body portion 11's deformation of being pressed by the leg portion 16 and about to swell can be absorbed by a deformation in which the inclined portion 15 becomes near flush with the joining surface 12. For this reason, the joining surface 12 of the joining element 10 press-fitted into the non-ferrous metal material 21 can be kept flat. Especially, even when a material of the joining element 10 is relatively so soft as 310 to 370HV10, the joining surface 12 of the joining element 10 press-fitted into the non-ferrous metal material 21 can be kept flat by the inclined portion 15. The inclined portion 15 that has been made flush with the joining surface 12 becomes a part of the joining surface 12.

A boundary B2 between the inclined portion 15 and the joining surface 12 (an outer peripheral edge of the joining surface 12) is located in a position farther from the virtual axis A than a boundary B1 between the leg portion 16 and the back surface 13 of the body portion 11 is. As a result, when the joining element 10 is press-fitted into the non-ferrous metal material 21 from the leg portion 16 by pressing the joining surface 12, the joining surface 12 can be pressed in a position on an extension of the leg portion 16 in the direction of the virtual axis A. As a result, the body portion 11 of the joining element 10 press-fitted into the non-ferrous metal material 21 can be made less prone to collapse inside the leg portion 16.

Figure 3:
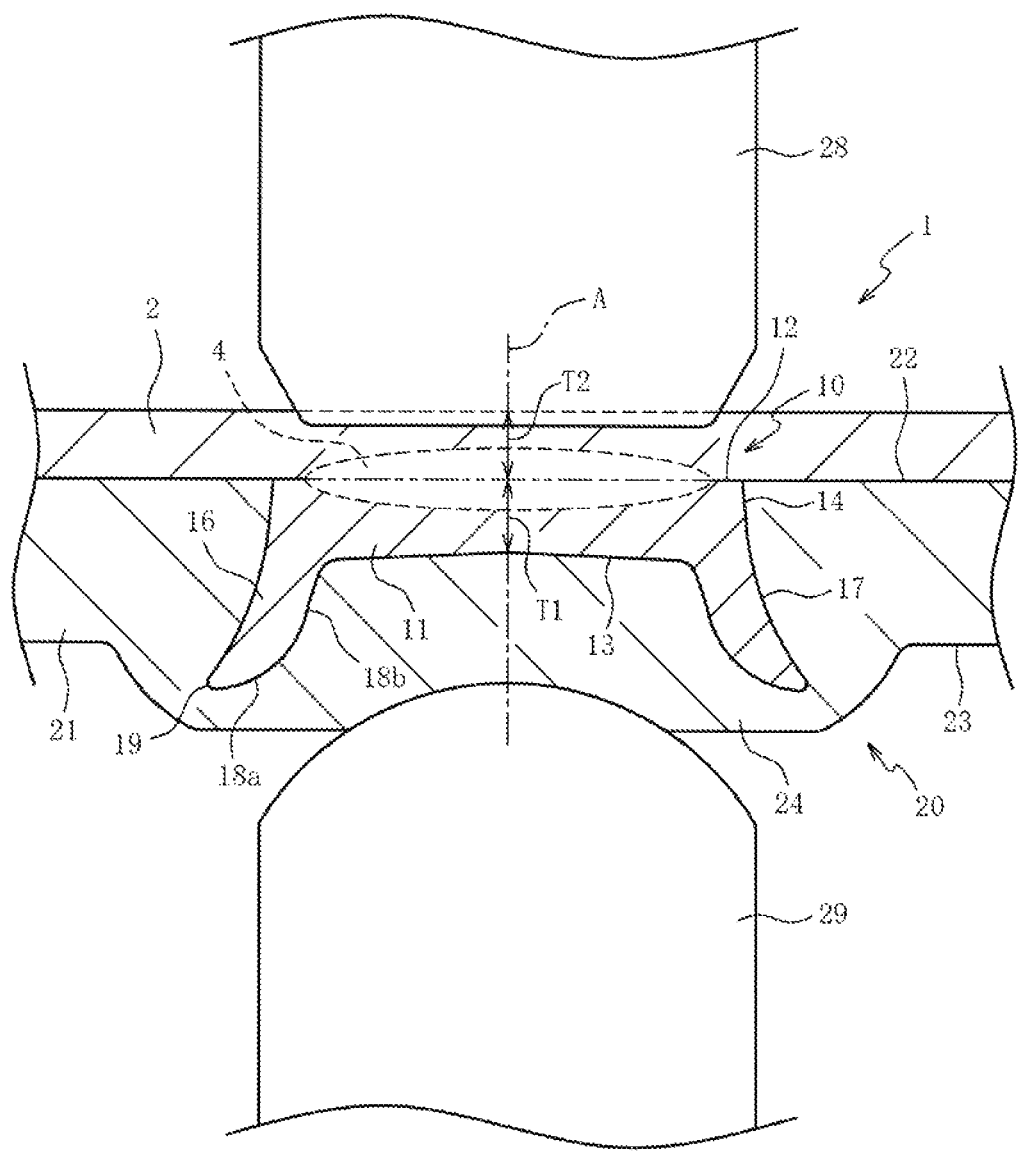
FIG. 3 is a cross-sectional view of a joined body obtained by welding a mating member to a welding metal body.

A description will be given to the joined body 1 obtained by joining the mating member 2 to the welding metal body 20 with reference to FIG. 3. FIG. 3 is a cross-sectional view of the joined body 1. In FIG. 3, as in FIGS. 1 and 2, a cross section including a virtual axis A is shown. The mating member 2 is a member made of ferrous metal and a portion of the mating member to be welded to the welding metal body 20 is formed in the shape of a plate.

To form the joined body 1, first, a rust-inhibiting sealer (not shown) is applied to the front surface 22 of the non-ferrous metal material 21 on which the mating member 2 is to be overlaid and the joining surface 12 of the joining element 10. This sealer is for reducing galvanic corrosion between the joining element 10 and the non-ferrous metal material 21 and between the non-ferrous metal material 21 and the mating member 2.

Subsequently, the mating member 2 is overlaid on the front surface 22 of the non-ferrous metal material 21. By spot-welding together the joining element 10 exposed from the front surface 22 and the mating member 2, a melted portion 4 is formed between the joining element 10 and the mating member 2 that are the same types of metals. Thus, the joined body 1 obtained by joining the non-ferrous metal material 21 and the mating member 2 with each other via the joining element 10 is formed.

In the present embodiment, direct resistance spot welding is used to weld the mating member 2 and the joining element 10 together. In this type of resistance spot welding, a current is passed between a pair of electrodes 28, 29 sandwiching the welding metal body 20 and the mating member 2 from both sides in the direction of the virtual axis A of the joining surface 12. A tip of the electrode 28 applied to the mating member 2 is flatly formed. Therefore, an indentation caused by the electrode 28 can be made less prone to remain in the mating member 2.

Since the back surface 23 of the covering portion 24 to which the electrode 29 is applied is a plane perpendicular to the virtual axis A, control of pressure application by the electrode 29 and an area of contact between the electrode 29 and the back surface 23 is facilitated. Since the covering portion 24 is swelled relative to the surrounding area of the back surface 23, the covering portion 24 provides a guide for a position where the electrode 29 should be applied.

A tip of the electrode 29 applied to the back surface 23 of the covering portion 24 is formed in the shape of a dome. Since an area of the non-ferrous metal material 21 located inside the leg portion 16 can be pressed by the electrode 29, the non-ferrous metal material 21 can be easily brought into tight contact with the back surface 13 of the body portion 11 of the joining element 10. As a result, power supply from the electrode 29 to the joining element 10 via the non-ferrous metal material 21 is facilitated and thus resistance spot welding can be stabilized.

Indirect, series, or parallel resistance spot welding may be adopted to weld the joining element 10 and the mating member 2 together. Further, laser welding, arc welding, or gas welding may be adopted to weld the joining element 10 and the mating member 2 together. The joining element 10 and the mating member 2 may be subjected to projection welding by providing a part of the joining surface 12 with a projection or proving the mating member 2 with a projection to be applied to the joining surface 12.

According to the above-mentioned joined body 1, the mating member 2 is welded to a part of the joining element 10 exposed from the front surface 22 of the non-ferrous metal material 21; and the remaining part of the joining element 10 is not exposed from the non-ferrous metal material 21 and is kept buried in the non-ferrous metal material 21. As a result, galvanic corrosion between the non-ferrous metal material 21 and the joining element 10 can be reduced. Consequently, increase in operation processes or a cost accompanying measures against galvanic corrosion on the back surface 23 side of the non-ferrous metal material 21 can be suppressed.

Since swelling of a part of the joining surface 12 can reduced by the inclined portion 15 continuing to an outer peripheral edge of the joining surface 12 as mentioned above, surface contact between the joining surface 12 and the mating member 2 is facilitated. As a result, weld strength between the joining element 10 and the mating member 2 can be enhanced. Further, the joining surface 12 and the front surface 22 of the non-ferrous metal material 21 are substantially flush with each other; therefore, when the mating member 2 overlaid on the joining surface 12 and the joining element 10 are welded together, production of a gap between the front surface 22 of the non-ferrous metal material 21 and the mating member 2 can be substantially prevented. Since corrosion caused by ingress of moisture or the like through the gap can be made less prone to occur in the joining element 10, the durability of the joining element 10 can be enhanced. As a result, the strength of bonding between the mating member 2 and the non-ferrous metal material 21 via the joining element 10 can be enhanced. Furthermore, the joining element 10 can be made still less prone to corrode by applying a sealer to between the front surface 22 of the non-ferrous metal material 21 and the mating member 2 to make ingress of moisture from therebetween to the joining element 10 side less prone to occur.

A thickness T1 of the joining element 10 in an area where the melted portion 4 is formed is preferably 0.8 to 2 times a thickness T2 of the mating member 2 in that area. The thickness T1, T2 of each part in an area where the melted portion 4 is formed indicates the thickness of each part before the melted portion 4 is formed. Especially, since the melted portion 4 is prone to be largest in the central portion, in the central portion in an area where the melted portion 4 is formed, it is preferable that a thickness T1 of the joining element 10 is 0.8 to 2 times a thickness T2 of the mating member 2. In FIG. 3, a plane of contact between the joining element 10 and the mating member 2 before the melted portion 4 is formed is indicated by an alternate long and two short dashes line and the front surface of the mating member 2 before an indentation due to the electrode 28 is formed is indicated by a broken line.

When a thickness T1 is 0.8 or more times a thickness T2, the size and position of the melted portion 4 formed between the joining element 10 and the mating member 2 can be appropriately adjusted and the melted portion 4 can be made less prone to arrive at the non-ferrous metal material 21. As a result, the strength of the joining element 10 and bonding strength between the joining element 10 and the non-ferrous metal material 21 can be ensured. When a thickness T1 is two or less times a thickness T2, force required to press-fit the joining element 10 into the non-ferrous metal material 21 until the joining surface 12 of the joining element 10 and the front surface 22 of the non-ferrous metal material 21 become flush with each other can be reduced and further, a weight of the joining element 10 can be reduced.

Since the joining element 10 is formed of low-carbon steel with a carbon content of 0.4 mass % or less as mentioned above, the joining element 10 can be prevented from becoming too hard and fragile due to heat affection of welding between the mating member 2 and the joining element 10. When a carbon content of the low-carbon steel is 0.2 mass % or less, hardening of the joining element 10 due to heat affection of welding can be sufficiently suppressed. As the result of the foregoing, weld cracking and reduction in toughness in the joining element 10 caused by hardening during welding can be suppressed. Therefore, the strength of bonding between the mating member 2 and the non-ferrous metal material 21 via the joining element 10 can be ensured.

A description will be given to a second embodiment with reference to FIG. 4A and FIG. 4B. In the description of the first embodiment, a case where an outer peripheral surface of the body portion 11 of the joining element 10 is formed of the parallel portion 14 and the inclined portion 15 and the outer peripheral surface 17 of the leg portion 16 is along with the virtual axis A is taken as an example. In a description of the second embodiment, meanwhile, a case where an outer peripheral surface of a body portion 31 of a joining element 30 is formed of an inclined portion 32 and an outer peripheral surface 17 of a leg portion 34 is inclined to a virtual axis A will be taken as an example. The same elements as in the first embodiment will be marked with the same reference numerals and a description of such elements will be omitted below.

Figure 4A:
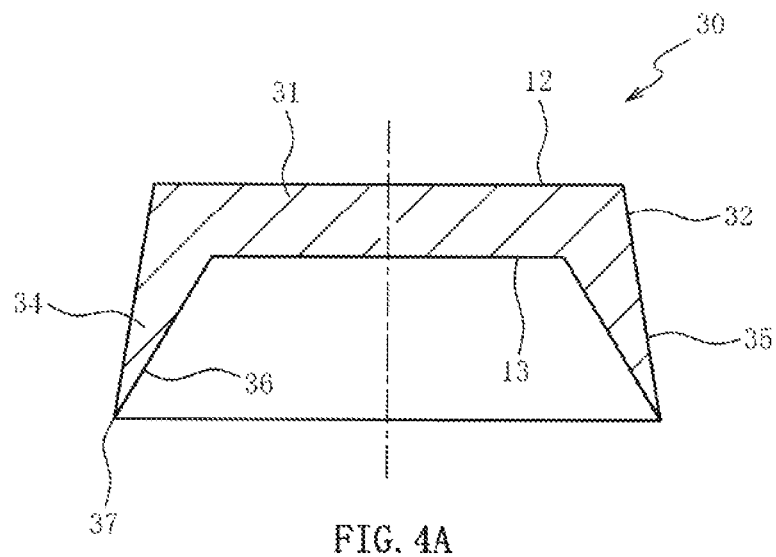
FIG. 4A is a cross-sectional view of a joining element in a second embodiment.

FIG. 4A is a cross-sectional view of the joining element 30 in the second embodiment. FIG. 4B is a cross-sectional view of a joined body 40 obtained by joining a mating member 2 and a non-ferrous metal material 42 with each other via the joining element 30. In FIG. 4B, a representation of an indentation caused by the electrodes 28, 29 (refer to FIG. 3) is omitted.

As shown in FIG. 4A, the joining element 30 includes the disk-shaped body portion 31 and the cylindrical leg portion 34 protruded from the body portion 31 and these portions are integrally formed of low-carbon steel with a carbon content of 0.4 mass % or less. The joining element 30 is formed in axial symmetry with respect to the virtual axis A. FIG. 4A and FIG. 4B show a cross section including the virtual axis A.

The body portion 31 includes: a joining surface 12; a back surface 13 located on the opposite side to the joining surface 12; and an outer peripheral surface continuing to an outer peripheral edge of the joining surface 12 and encircling the back surface 13. The outer peripheral surface of the body portion 31 is formed of the inclined portion 32 brought away from the virtual axis A as it goes away from the joining surface 12. The inclined portion 32 continues to the entire circumference of the outer peripheral edge of the joining surface 12.

The leg portion 34 is a cylindrical area protruded from the periphery side of the back surface 13 of the body portion 31. An outer peripheral surface (outer surface) 35 of the leg portion 34 continues to the entire circumference of the inclined portion 32 of the body portion 31. The outer peripheral surface 35 and inner circumferential surface 36 of the leg portion 34 are surfaces brought away from the joining surface 12 as they go away from the virtual axis A and are gradually increased in diameter as they go toward a tip 37 of the leg portion 34 at a distance from the body portion 31. The leg portion 34 is reduced in thickness as it goes toward the tip 37. The outer peripheral surface 35 is linearly formed together with the inclined portion 32 in a cross section including the virtual axis A.

Figure 4B:
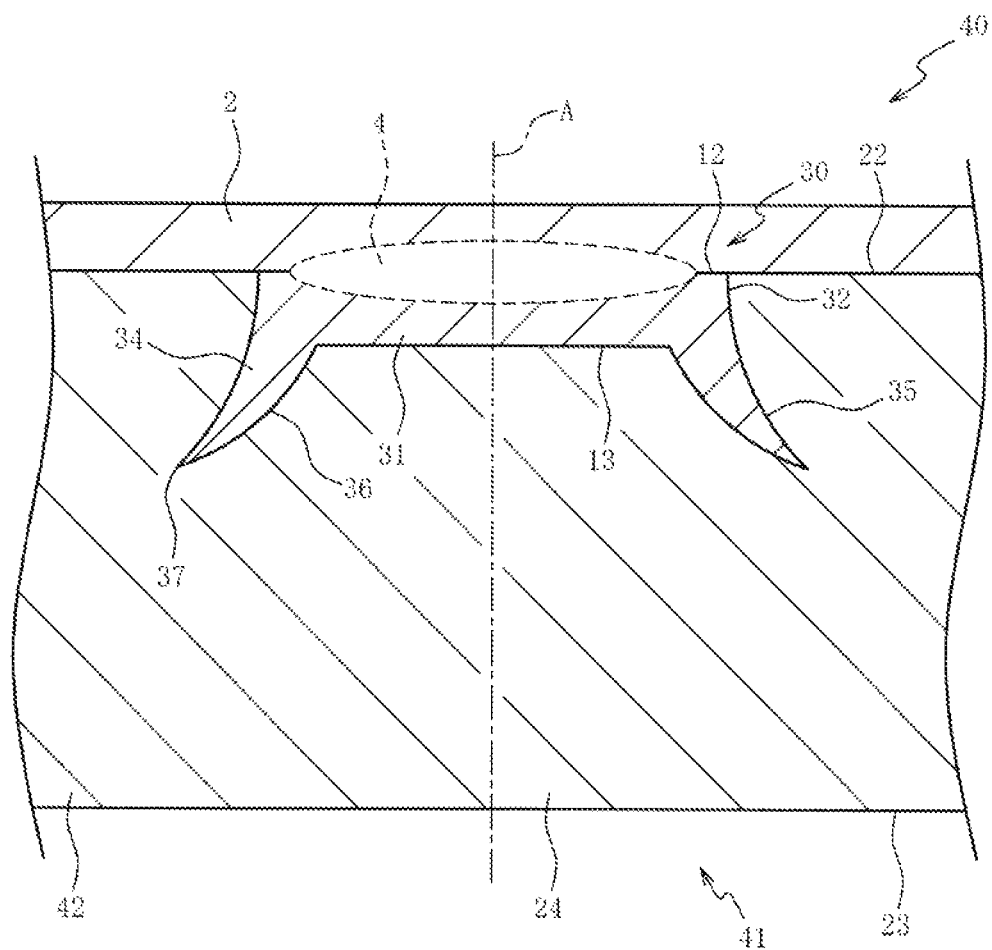
FIG. 4B is a cross-sectional view of a joined body.

As shown in FIG. 4B, the joining element 30 is press-fitted into the non-ferrous metal material 42 to form a welding metal body 41 and a melted portion 4 is formed between the joining element 30 of the welding metal body 41 and the mating member 2 by welding. Thus, the joined body 40 is manufactured. The non-ferrous metal material 42 is identical with the non-ferrous metal material 21 in configuration except that the non-ferrous metal material is formed thicker than the non-ferrous metal material 21 in the first embodiment. A thickness of the non-ferrous metal material 42 is two or more times a dimension of the section from the joining surface 12 to the tip 37 of the joining element 30 in the direction of the virtual axis A. For this reason, even when the joining element 30 is press-fitted into the non-ferrous metal material 42, the back surface 23 of the non-ferrous metal material 42 hardly swells.

Since the inner circumferential surface 36 of the leg portion 34 prior to press-fitting shown in FIG. 4A is gradually increased in diameter as it goes toward the tip 37, radially outward force is applied from the non-ferrous metal material 42 to the leg portion 34 during press-fitting of the joining element 30. For this reason, in the welding metal body 41 shown in FIG. 4B, the leg portion 34 buried in the non-ferrous metal material 42 is plastically deformed to curve outward in the radial direction as it goes toward the tip 37. Since a lodging portion including the outer peripheral surface 35 facing to the front surface 22 of the non-ferrous metal material 42 is formed by this leg portion 34, the joining element 30 can be made less prone to come out of the non-ferrous metal material 42.

The outer peripheral surface 35 of the leg portion 34 prior to press-fitting is gradually increased in diameter as it goes toward the tip 37 and the joining element 30 is press-fitted into the non-ferrous metal material 42 from the leg portion 34. At this time, of reaction force received by the leg portion 34 from the non-ferrous metal material 42, a component in the direction of the virtual axis A being about to contribute to swelling of the joining surface 12 of the body portion 31 can be reduced by the outer peripheral surface 35 increased in diameter. As a result, the joining surface 12 can be easily kept in the shape of a plate.

A description will be given to a third embodiment with reference to FIG. 5. In the description of the first embodiment, a case where the leg portion 16 is plastically deformed in conjunction with press-fitting of the joining element 10 into the non-ferrous metal material 21 and the joined body 1 provided with the lodging portion including a surface facing to the front surface 22 of the non-ferrous metal material 21 is thereby formed is taken as an example. In a description of the third embodiment, meanwhile, a case where a joined body 50 obtained by joining a mating member 2 and a non-ferrous metal material 42 together by a joining element 52 whose leg portion 54 hardly plastically deforms between before and after press-fitting will be taken as an example. The same elements as in the first and second embodiments will be marked with the same reference numerals and a description of such elements will be omitted.

Figure 5:
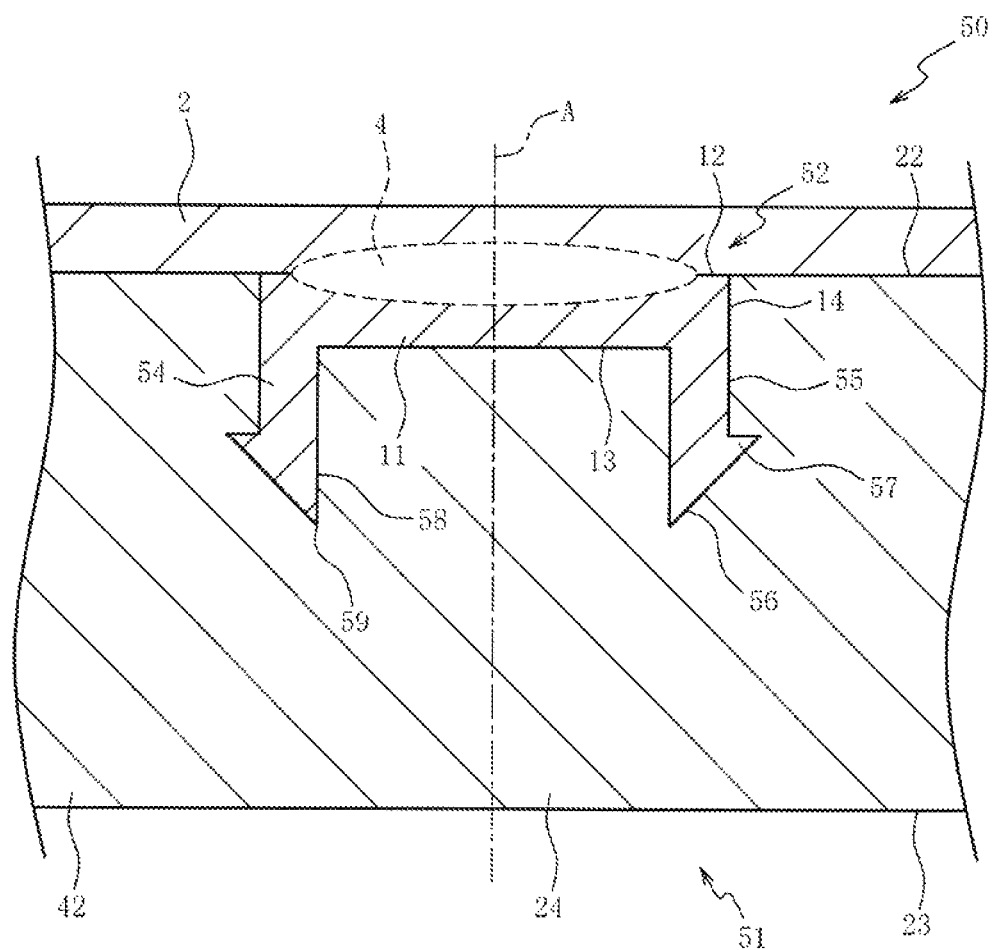
FIG. 5 is a cross-sectional view of a joined body in a third embodiment.

FIG. 5 is a cross-sectional view of the joined body 50 in the third embodiment. In FIG. 5, a representation of an indentation caused by the electrodes 28, 29 (refer to FIG. 3) is omitted. The joined body 50 includes the mating member 2 and a welding metal body 51 obtained by press-fitting the joining element 52 into the non-ferrous metal material 42. By welding the mating member 2 to the joining element 52 of the welding metal body 51 to form a melted portion 4, the joined body 50 is manufactured.

The joining element 52 includes a disk-shaped body portion 11 and a cylindrical leg portion 54 protruded from the periphery side of the back surface 13 of the body portion 11 and these portions are integrally formed of low-carbon steel with a carbon content of 0.4 mass % or less. The joining element 52 is formed in axial symmetry with respect to a virtual axis A. FIG. 5 shows a cross section including the virtual axis A.

The inner circumferential surface 58 of the leg portion 54 is formed in parallel with the virtual axis A from the back surface 13 to a tip 59 of the leg portion in a cross section including the virtual axis A. For this reason, when the joining element 52 is press-fitted into the non-ferrous metal material 42, the leg portion 54 can be made difficult to widen outward in the radial direction. Since the leg portion 54 is less prone to plastically deform between before and after press-fitting, microscopic shearing in metallographic structure and the like associated with plastic deformation can be suppressed and the durability of the leg portion 54 can be ensured.

An outer surface of the leg portion 54 includes: a first outer surface 55 continuing to the entire circumference of a parallel portion 14 of the body portion 11; and a second outer surface 56 continuing to the entire circumference of a tip 59 of the leg portion 54. The first outer surface 55 is formed in parallel with the virtual axis A in a cross section including the virtual axis A. The second outer surface 56 is brought away from the virtual axis A as it goes away from the tip 59, that is, gradually increased in diameter as it goes away from the tip 59. The first outer surface 55 and the second outer surface 56 are connected with each other by a surface vertically jutting out stepwise from an edge of the first outer surface 55 on the tip 59 side. An area including this stepwise surface provides a lodging portion 57.

When the above-mentioned joining element 52 is press-fitted into the non-ferrous metal material 42, the second outer surface 56 receives reaction force heading inward in the radial direction of the cylindrical leg portion 54 from the non-ferrous metal material 42. As a result, the leg portion 54 can be made less prone to plastically deform between before and after press-fitting; therefore, the durability of the leg portion 54 can be ensured. Since the leg portion 54 includes the lodging portion 57 having a surface facing to the front surface 22 of the non-ferrous metal material 42, the joining element 52 can be made less prone to come out of the non-ferrous metal material 42.

A description will be given to a fourth embodiment with reference to FIG. 6. In the description of the first embodiment, a case where the joined body 1 uses the joining element 10 whose leg portion 16 is protruded from the periphery side of the back surface 13 of the body portion 11 is taken as an example. In a description of the fourth embodiment, meanwhile, a case where a joined body 60 uses a joining element 62 without a leg portion will be taken as an example. The same elements as in the first and second embodiments will be marked with the same reference numerals and a description of such elements will be omitted below.

Figure 6:
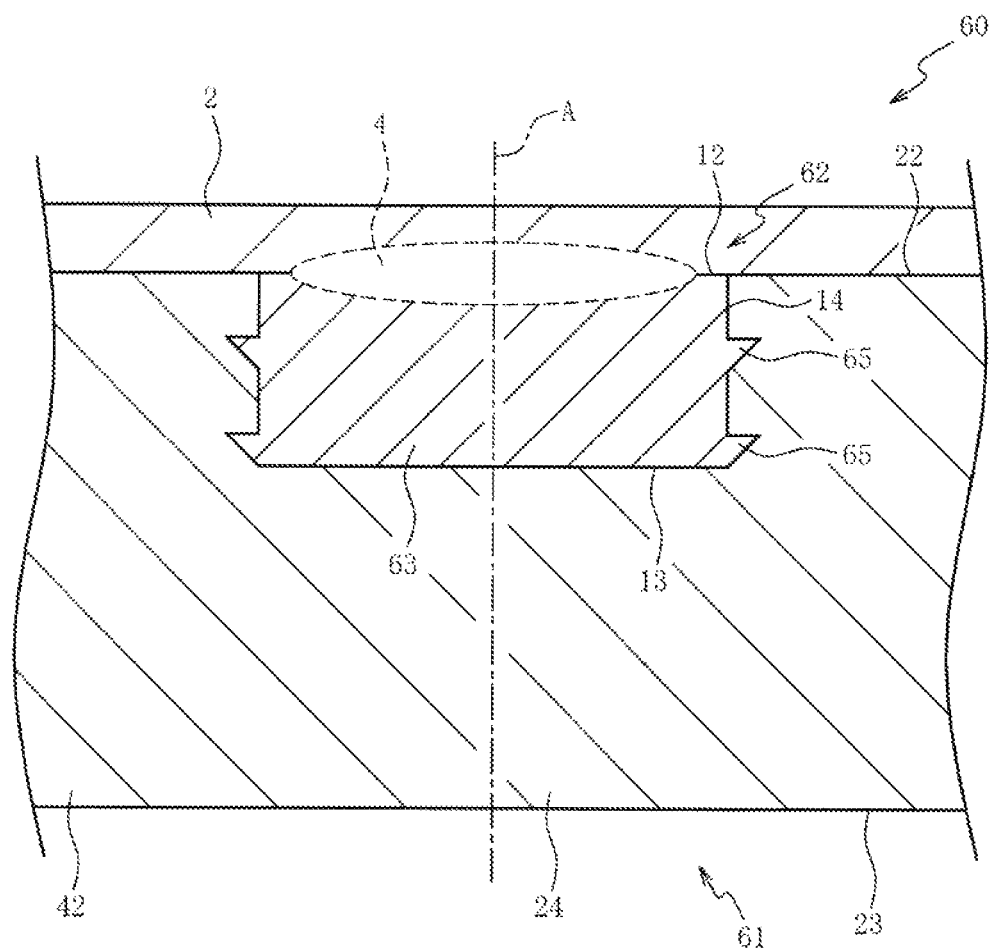
FIG. 6 is a cross-sectional view of a joined body in a fourth embodiment.

FIG. 6 is a cross-sectional view of the joined body 60 in the fourth embodiment. In FIG. 6, a representation of an indentation caused by the electrodes 28, 29 (refer to FIG. 3) is omitted. The joined body 60 includes a mating member 2 and a welding metal body 61 obtained by press-fitting the joining element 62 into a non-ferrous metal material 42. By welding the mating member 2 to the joining element 62 of the welding metal body 61 to form a melted portion 4, the joined body 60 is manufactured.

The joining element 62 includes a cylindrical body portion 63 and a plurality of lodging portions 65 protruded from a parallel portion 14 as an outer peripheral surface of the body portion 63 and these portions are integrally formed of low-carbon steel with a carbon content of 0.4 mass % or less. The joining element 62 is formed in axial symmetry with respect to a virtual axis A orthogonal to a joining surface 12 of the body portion 63. FIG. 6 shows a cross section including the virtual axis A.

The body portion 63 is configured the same as the body portion 11 in the first embodiment except that the body portion is formed thicker than the body portion 11. FIG. 6 shows a state in which an inclined portion 15 (refer to FIG. 1) located at a corner between the joining surface 12 and an outer peripheral surface of the body portion 63 has been deformed in conjunction with press-fitting of the joining element 62 into the non-ferrous metal material 42 and become flush with the joining surface 12.

The lodging portions 65 are formed in a portion of the joining element 62 to be buried in the non-ferrous metal material 42. With the joining element 62 buried in the non-ferrous metal material 42, the lodging portions 65 have a surface facing to the front surface 22 of the non-ferrous metal material 42; therefore, the joining element 62 can be made less prone to come out of the non-ferrous metal material 42.

The joining element 62 is in such a simple shape as a cylindrical shape unlike the joining elements 10, 30, 52 including the leg portions 16, 34, 54 in the first to third embodiments. For this reason, manufacture of the joining element 62 is facilitated. Further, the joining element 62 obviates consideration of buckling of a leg portion in designing.

Figure 7A:
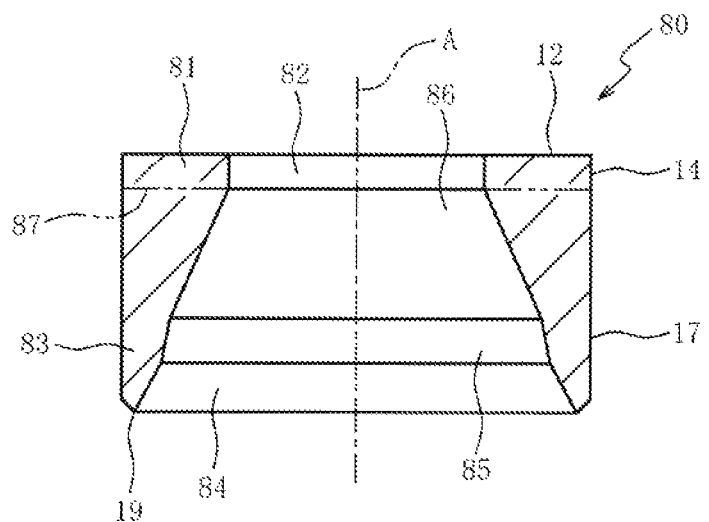
FIG. 7A is a cross-sectional view of a joining element in a fifth embodiment.
Figure 7B:
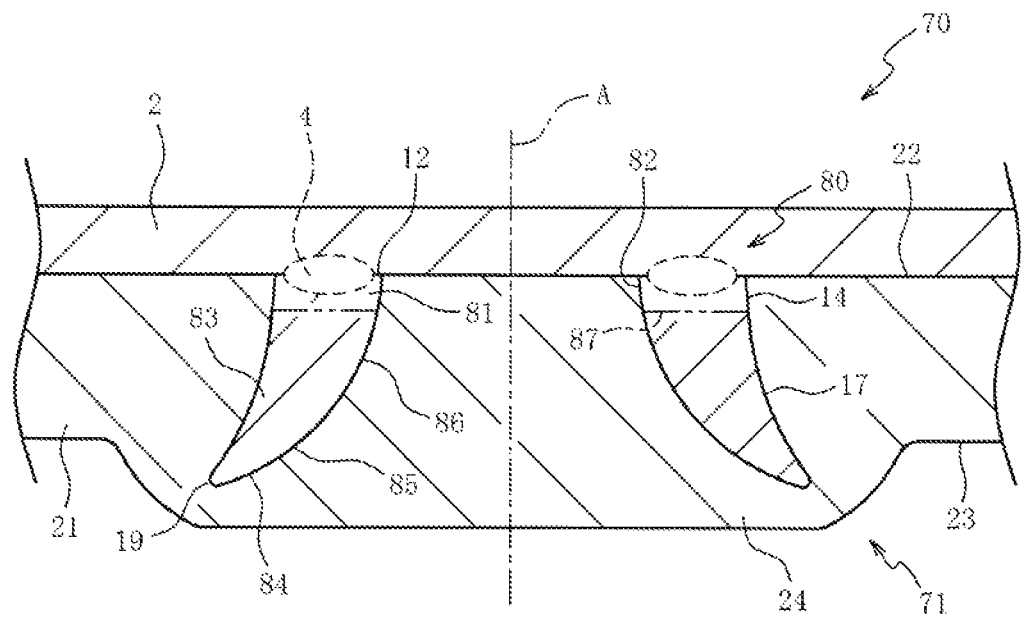
FIG. 7B is a cross-sectional view of a joined body.

A description will be given to a fifth embodiment with reference to FIG. 7A and FIG. 7B. In the description of the first embodiment, a case where the body portion 11 of the joining element 10 is in a disk shape is taken as an example. In a description of the fifth embodiment, meanwhile, a case where a through hole 82 is formed in the center of a body portion 81 of a joining element 80 in the radial direction and the body portion 81 assumes the shape of an annular plate will be taken as an example. The same elements as in the first embodiment will be marked with the same reference numerals and a description of such elements will be omitted below. FIG. 7A is a cross-sectional view of the joining element 80 in the fifth embodiment. FIG. 7B is a cross-sectional view of a joined body 70. In FIG. 7B, a representation of an indentation caused by the electrodes 28, 29 (refer to FIG. 3) is omitted.

As shown in FIG. 7A, the joining element 80 includes a body portion 81 in the shape of an annular plate with a through hole 82 formed in the radial center and a cylindrical leg portion 83 protruded from the body portion 81 and these portions are integrally formed of low-carbon steel with a carbon content of 0.4 mass % or less. The joining element 80 is formed in axial symmetry with respect to a virtual axis A. FIG. 7A and FIG. 7B show a cross section including the virtual axis A. In FIG. 7A and FIG. 7B, a boundary 87 between the body portion 81 and the leg portion 83 is indicated by an alternate long and two short dashes line.

The body portion 81 includes a joining surface 12 and a parallel portion 14 as an outer peripheral surface continuing to an outer peripheral edge of the joining surface 12 and encircling the virtual axis A. The through hole 82 is open in the joining surface 12 and communicates to the inside (virtual axis A side) of the leg portion 83.

The leg portion 83 is a cylindrical area protruded from the opposite side to the joining surface 12 of the body portion 81. An outer peripheral surface (outer surface) 17 of the leg portion 83 continues to the entire circumference of the parallel portion 14 of the body portion 81. The inner circumferential surface of the leg portion 83 facing to the virtual axis A is gradually increased in diameter as it goes toward a tip 19 of the leg portion 83 at a distance from the body portion 81. The inner circumferential surface of the leg portion 83 includes: a first inner surface 84 continuing to the entire circumference of the annular tip 19; a second inner surface 85 extended from the entire circumference of the first inner surface 84 toward the body portion 81; and a third inner surface 86 coupling the entire circumference of the second inner surface 85 with the entire circumference of the inner wall surface of the through hole 82 of the body portion 81.

As shown in FIG. 7B, the joining element 80 is press-fitted into a non-ferrous metal material 21 to form a welding metal body 71 and a melted portion 4 is formed between the joining element 80 of the welding metal body 71 and a mating member 2 by welding. Thus, a joined body 70 is manufactured. The first inner surface 84, second inner surface 85, and third inner surface 86 of the leg portion 83 prior to press-fitting shown in FIG. 7A are gradually increased in diameter as they go toward the tip 19; therefore, radially outward force is applied from the non-ferrous metal material 21 to the leg portion 83 during press-fitting of the joining element 80. For this reason, in the welding metal body 71 shown in FIG. 7B, the leg portion 83 buried in the non-ferrous metal material 21 plastically deforms so that the outer peripheral surface 17 is curved outward in the radial direction as it goes toward the tip 19. Since a lodging portion having the outer peripheral surface 17 facing to the front surface 22 of the non-ferrous metal material 21 is formed by the leg portion 83, the joining element 80 can be made less prone to come out of the non-ferrous metal material 21.

With respect to the leg portion 83 prior to press-fitting shown in FIG. 7A, in a cross section including the virtual axis A, an angle of inclination to the virtual axis A is increased in the order of the second inner surface 85 to the third inner surface 86 to the first inner surface 84. Further, an axial dimension of the third inner surface 86 is larger than a sum of an axial dimension of the first inner surface 84 and an axial dimension of the second inner surface 85. Since an axial dimension of a portion of the leg portion 83 increased in thickness by the third inner surface 86 is ensured as mentioned above, the leg portion 83 can be made less prone to cause buckling during press-fitting. Further, the tip 19 of the leg portion 83 tapered by the first inner surface 84 can be made easily dig into the non-ferrous metal material 21. Furthermore, because of a relation of inclination angle, the leg portion 83 in the second inner surface 85 is prone to curve outward in the radial direction relative to the leg portion 83 in the third inner surface 86; therefore, the leg portion 83 can be less prone to come out of the non-ferrous metal material 21.

The leg portion 83 is formed in the shape of a cylinder encircling the virtual axis A from all around the virtual axis. Therefore, when the joining element 80 is press-fitted into the non-ferrous metal material 21 from the leg portion 83, air may remain between the body portion 81 and the non-ferrous metal material 21 inside the leg portion 83 without the through hole 82 in the body portion 81. Even without the through hole 82, air can be prevented from remaining between the body portion 81 and the non-ferrous metal material 21 after press-fitting by press-fitting the joining element 80 into the non-ferrous metal material 21 in a vacuum.

In the present embodiment, the through hole 82 open in the joining surface 12 communicates to the inside of the leg portion 83; therefore, air is less prone to remain between the body portion 81 and the non-ferrous metal material 21 after press-fitting without press-fitting the joining element 80 into the non-ferrous metal material 21 in a vacuum. As a result, when the mating member 2 applied to the joining surface 12 and the joining element 80 are welded together, heat transfer from the joining element 80 to the non-ferrous metal material 21 is less prone to be hindered by air between the body portion 81 and the non-ferrous metal material 21. Thus, the joining element 80 is stably cooled during welding and the shape and size of the melted portion 4 between the joining element 80 and the mating member 2 are stabilized. Consequently, weld strength between the joining element 80 and the mating member 2 is enhanced.

The inner wall surface of the through hole 82 continues to the entire circumference of the third inner surface 86 of the leg portion 83. Therefore, when the joining element 80 is press-fitted into the non-ferrous metal material 21, the body portion 81 around the through hole 82 is made less prone to be pressed by the non-ferrous metal material 21 inside the leg portion 83 and a part of the joining surface 12 can be made less prone to swell. As a result, surface contact between the joining surface 12 of the joining element 80 press-fitted into the non-ferrous metal material 21 and the mating member 2 is facilitated and thus, weld strength between the joining element 80 and the mating member 2 can be enhanced.

The inner wall surface of the through hole 82 is parallel to the virtual axis A in a cross section including the virtual axis A. As a result, when the joining element 80 is press-fitted into the non-ferrous metal material 21 by pressing the joining surface 12 with a punch or the like, force in the axial direction of the virtual axis A applied to the punch or the like from the leg portion 83 via the body portion 81 can be made substantially uniform throughout the joining surface 12. As a result, the joining element 80 can be made less prone to cause buckling during press-fitting. Further, since the inner wall surface of the through hole 82 parallel to the virtual axis A is less susceptible to force in the axial direction of the virtual axis A from the non-ferrous metal material 21, a part of the joining surface 12 becomes less prone to swell.

Figure 8A:
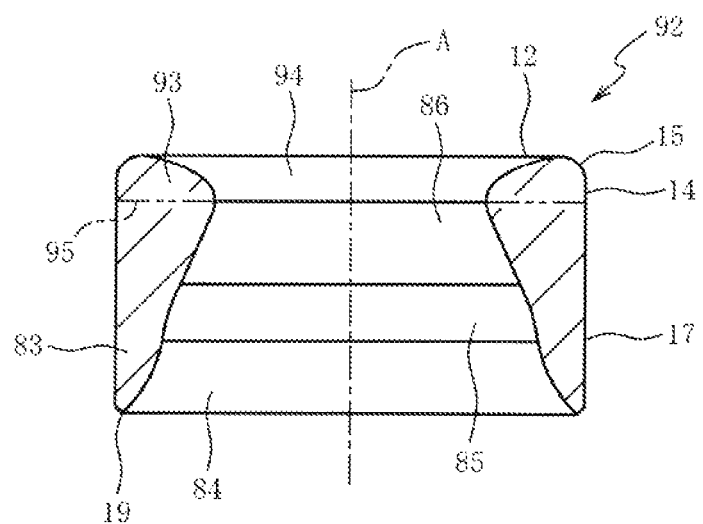
FIG. 8A is a cross-sectional view of a joining element in a sixth embodiment.
Figure 8B:
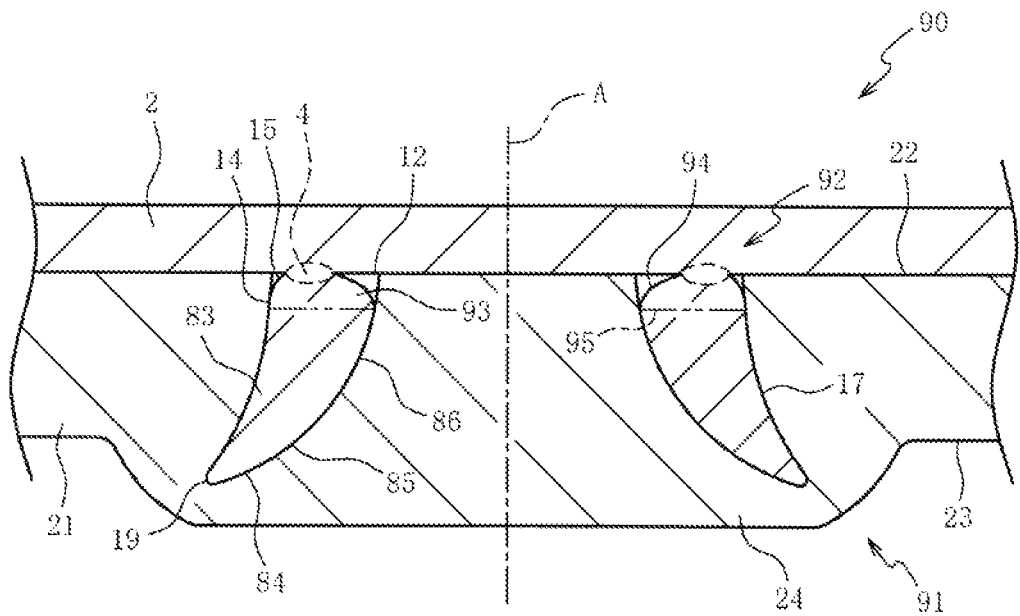
FIG. 8B is a cross-sectional view of a joined body.

A description will be given to a sixth embodiment with reference to FIG. 8A and FIG. 8B. In the description of the fifth embodiment, a case where the inner wall surface of the through hole 82 is parallel to the virtual axis A in a cross section including the virtual axis A is taken as an example. In a description of the sixth embodiment, meanwhile, an inner wall surface of a through hole 94 is inclined toward a virtual axis A as it goes toward a leg portion 83 in a cross section including the virtual axis A will be taken as an example. The same elements as in the first and fifth embodiments will be marked with the same reference numerals and a description of such elements will be omitted below. FIG. 8A is a cross-sectional view of a joining element 92 in the sixth embodiment and FIG. 8B is a cross-sectional view of a joined body 90. In FIG. 8B, a representation of an indentation caused by the electrodes 28, 29 (refer to FIG. 3) is omitted.

As shown in FIG. 8A, the joining element 92 includes a body portion 93 in the shape of an annular plate with the through hole 94 formed in the radial center and a cylindrical leg portion 83 protruded from the body portion 93 and these portions are integrally formed of low-carbon steel with a carbon content of 0.4 mass % or less. The joining element 92 is formed in axial symmetry with respect to a virtual axis A. FIG. 8A and FIG. 8B show a cross section including the virtual axis A. In FIG. 8A and FIG. 8B, a boundary 95 between the body portion 93 and the leg portion 83 is indicated by an alternate long and two short dashes line.

The body portion 93 includes a joining surface 12, an inclined portion 15 continues to an outer peripheral edge of the joining surface 12, and a parallel portion 14 coupling the inclined portion 15 with the outer peripheral surface 17 of the leg portion 83. The through hole 94 is open in the joining surface 12 and communicates to the inside (virtual axis A side) of the leg portion 83.

The inner wall surface of the through hole 94 is nonparallel to the virtual axis A in a cross section including the virtual axis A and is inclined toward the virtual axis A as it goes toward the leg portion 83. The lower end of the inner wall surface of the through hole 94 continues to the entire circumference of a third inner surface 86 of the leg portion 83. The upper end of the inner wall surface of the through hole 94 continues to an outer peripheral edge of the joining surface 12. As a result, a linear area caused by the outer peripheral edge remains in the joining surface 12 with the through hole 94 formed therein.

As shown in FIG. 8B, the joining element 92 is press-fitted into a non-ferrous metal material 21 to form a welding metal body 91 and a melted portion 4 is formed between the joining element 92 of the welding metal body 91 and a mating member 2 by welding. Thus, a joined body 90 is manufactured. Since the leg portion 83 buried in the non-ferrous metal material 21 forms a lodging portion as in the fifth embodiment, the joining element 92 can be made less prone to come out of the non-ferrous metal material 21. Further, air is made less prone to remain between the body portion 93 and the non-ferrous metal material 21 by a through hole 94 formed in the body portion 93 after press-fitting.

When the joining element 92 is press-fitted into the non-ferrous metal material 21, the vicinity of the joining surface 12 linearly remaining due to formation of the through hole 94 collapses and a width of the joining surface 12 is slightly increased. Nevertheless, since the width of the joining surface 12 is sufficiently narrow, a current is concentrated on the narrow joining surface 12 in contact with the mating member 2 during spot welding as in projection welding. For this reason, the center position of heating in the radial direction is stabilized during welding and a heat value becomes near uniform in the entire circumferential direction. As a result, the melted portion 4 between the joining element 92 and the mating member 2 can be homogenized in the entire circumferential direction and thus, bonding strength between the joining element 92 and the mating member 2 can be enhanced.

Figure 9A:
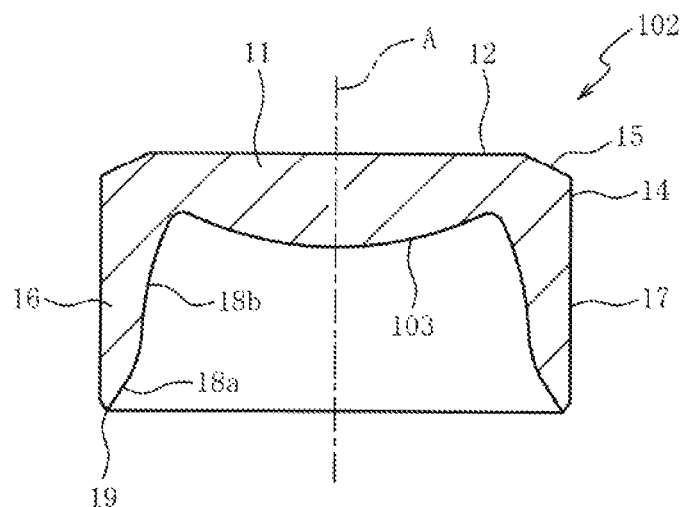
FIG. 9A is a cross-sectional view of a joining element in a seventh embodiment.
Figure 9B:
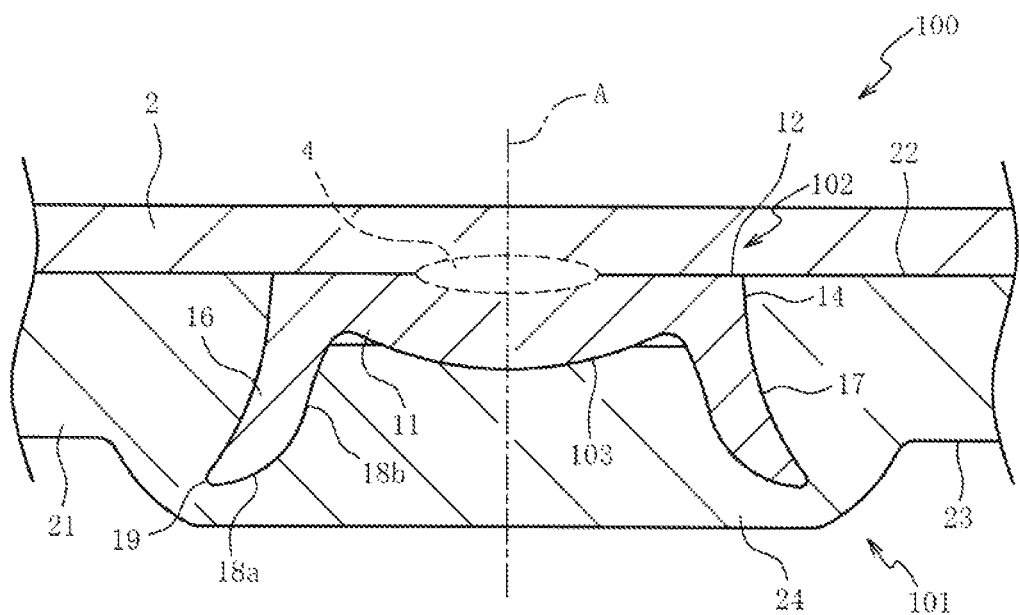
FIG. 9B is a cross-sectional view of a joined body.

A description will be given to a seventh embodiment with reference to FIG. 9A and FIG. 9B. In the description of the first embodiment, a case where the back surface 13 of the body portion 11 is in the shape of concavity is taken as an example. In a description of the seventh embodiment, meanwhile, a case where the back surface 103 of a body portion 11 is in the shape of convexity will be taken as an example. The same elements as in the first embodiment will be marked with the same reference numerals and a description of such elements will be omitted below. FIG. 9A is a cross-sectional view of a joining element 102 in the seventh embodiment and FIG. 9B is a cross-sectional view of a joined body 100. In FIG. 9B, a representation of an indentation caused by the electrodes 28, 29 (refer to FIG. 3) is omitted.

As shown in FIG. 9A, as a whole, the back surface 103 of the body portion 11 of the joining element 102 is formed in the shape of convexity and the back surface swells to the opposite side to the joining surface 12 as it goes toward the radial center (virtual axis A). The joining element 102 is configured the same as the joining element 10 in the first embodiment except the shape of the back surface 103.

As shown in FIG. 9B, the joining element 102 is press-fitted into a non-ferrous metal material 21 to form a welding metal body 101 and a melted portion 4 is formed between the joining element 102 of the welding metal body 101 and a mating member 2 by welding. Thus, a joined body 100 is manufactured. A leg portion 16 is formed in the shape of a cylinder encircling a virtual axis A from all around the virtual axis. Therefore, air may remain between the back surface 103 of the body portion 11 and the non-ferrous metal material 21 inside the leg portion 16 after the joining element 102 is press-fitted into the non-ferrous metal material 21.

However, since the back surface 103 is formed in the shape of convexity, air collects between the peripheral portion (leg portion 16 side) of the convexity and the non-ferrous metal material 21 and tight contact between the central portion (central portion of the back surface 103 in the radial direction) of the convexity and the non-ferrous metal material 21 is facilitated. As a result, when the mating member 2 applied to the joining surface 12 and the joining element 102 are welded together, heat transfer from the joining element 102 to the non-ferrous metal material 21 is facilitated. Therefore, the joining element 102 is stably cooled during welding and the shape and size of the melted portion 4 between the joining element 102 and the mating member 2 are stabilized. Consequently, weld strength between the joining element 102 and the mating member 2 can be enhanced.

Unlike the fifth and sixth embodiments, the joining element 102 does not have a through hole 82, 94 open in the joining surface 12 and thus, the melted portion 4 can be easily enlarged as compared with cases where a through hole 82, 94 is provided. As a result, weld strength between the joining element 102 and the mating member 2 can be enhanced.

A shape of convexity of the back surface 103 and welding conditions are preferably so set that the melted portion 4 is positioned inside the limb of an area of contact between the back surface 103 of the joining element 102 and the non-ferrous metal material 21 in the radial direction. As a result, heat transfer is facilitated from a central portion of the joining element 102 in the radial direction to the non-ferrous metal material 21 (The above central portion is a portion where a heat value is maximized during welding of the joining element 102 and the mating member 2 and where the melted portion 4 is to be formed). Consequently, the joining element 102 is more stably cooled during welding and the shape and size of the melted portion 4 between the joining element 102 and the mating member 2 are more stabilized.

Up to this point, the present invention has been described based on embodiments but the present invention is not limited to these embodiments at all and it is easily inferred that the present invention can be variously improved or modified without departing from the subject matter of the present invention. For example, a portion of the mating member 2 welded to the joining element 10, 30, 52, 62, 80, 92, 102 need not be in the shape of a plate. A shape of the mating member 2 may be freely set as long as the mating member can be welded with the joining element 10, 30, 52, 62, 80, 92, 102. A portion of the non-ferrous metal material 21, 42 into which the joining element 10, 30, 52, 62, 80, 92, 102 is press-fitted need not be in the shape of a plate. A shape of the non-ferrous metal material 21, 42 may be freely set as long as the non-ferrous metal material has a predetermined surface facing to the mating member 2 when the joined body 1, 40, 50, 60, 70, 90, 100 is formed. The joining element 10, 30, 52, 62, 80, 92, 102 may be press-fitted into an area where two or more non-ferrous metal materials are stacked.

In the description of the above embodiments, a case where the joining element 10 is formed of a material with a Vickers hardness suitable for press-fitting into the non-ferrous metal material 21 made of an aluminum alloy is taken as an example. Instead, a Vickers hardness of a material of the joining element 10 may be appropriately changed according to a material of a metal forming the non-ferrous metal material 21. In the above description, a case where the joining element 10 is formed of low-carbon steel that can be relatively easily welded is taken as an example but the present invention is not limited to this. The joining element 10 may be formed of steel with a carbon content of larger than 0.4 mass % according to a welding method or the like.

In the description of the above embodiments, a case where the joining surface 12 is in the shape of a flat plate is taken as an example but the present invention is not limited to this. The joining surface may be formed as a curved surface or the like based on a relation to the mating member 2. In cases where the joining surface is a curved surface, a virtual axis A refers to an axis orthogonal to a tangential plane of the curved surface in a predetermined position. A part of the joining surface 12 may be provided with a projection or a recess.

With respect to the joining element 10, 30, 52, 62, 80, 92, 102, a shape of the body portion 11, 31, 63, 81, 93 or the leg portion 16, 34, 54, 83 may be appropriately changed as long as the joining element includes a lodging portion having a surface facing to the front surface (predetermined surface) 22 of the non-ferrous metal material 21, 42 when press-fitted into the non-ferrous metal material 21, 42. For example, the front surface of a body portion in the shape of a rectangular flat plate may be taken as the joining surface 12 and a tip of a leg portion protruded from the center of the back surface of the body portion may be provided with a lodging portion to form a joining element.

In the description of the first to third and fifth to seventh embodiments, a case where the leg portion 16, 34, 54, 83 of the joining element 10, 30, 52, 80, 92, 102 is in the shape of a cylinder centered on the virtual axis A is taken as an example but the present invention is not limited to this. The leg portion 16, 34, 54 may be intermittently provided around the virtual axis A. In this case, without the through hole 82, 94, air between the body portion 11, 31, 81, 93 and the non-ferrous metal material 21 can be purged from between the intermittently provided leg portions 16, 34, 54.

The leg portion 16, 34, 54, 83 may be formed in the shape of a rectangular cylinder. Tabular leg portions 16, 34, 54 may be provided on both sides of the virtual axis A. The inclined portion 15, 32 continuing to the joining surface 12 is preferably located in the outer peripheral surface of the body portion 11, 31, 81, 93 in a position where the outer peripheral surface 17, 35 (first outer surface 55) of this leg portion 16, 34, 54, 83 continues. As a result, when the joining element is press-fitted into the non-ferrous metal material 21, 42, a swelling deformation of the body portion 11, 31, 81, 93 under pressure by the leg portion 16, 34, 54, 83 can be absorbed by a deformation of the inclined portion 15, 32.

The inclined portion 15, 32 continuing to the joining surface 12 need not be provided regardless of whether the leg portion 16, 34, 54 is provided or not. The body portion 11, 31, 81, 93 may be provided with a flange jutting outward in the radial direction relative to the leg portion 16, 34, 54, 83. In this case, since the flange is located outside a portion of the body portion 11, 31, 81, 93 pressed by the leg portion 16, 34, 54, 83 during press-fitting, the outer peripheral edge of the joining surface 12 can be made less prone to get into between a punch and a clamper.

In the description of the above embodiments, a case where the joining element 10, 30, 52, 62, 80, 92, 102 is press-fitted into the non-ferrous metal material 21, 42 until the joining surface 12 and the front surface 22 of the non-ferrous metal material 21, 42 become flush with each other but the present invention is not limited to this. The joining element 10, 30, 52, 62, 80, 92, 102 may be lifted from the front surface 22 by 1 mm or more.

In the description of the fifth and sixth embodiments, a case where the inner wall surface of the through hole 82, 94 provided in the body portion 81, 93 continues to the entire circumference of the inner surface (third inner surface 86) of the leg portion 83 and the back surface 13 (refer to FIG. 1 and the like) does not remain inside the leg portion 83 is taken as an example but the present invention is not limited to this. A through hole may be formed in the body portion 81, 93 so that the inner wall surface of the through hole does not continues to the inner surface of the leg portion 83 and the back surface 13 remains inside the leg portion 83. In this case, a plurality of through holes may be formed in the body portion 81, 93. A through hole may be formed in the body portion 11, 31, 63 of the joining element 10, 30, 52, 62 in the first to fourth embodiments.

Figure 10:
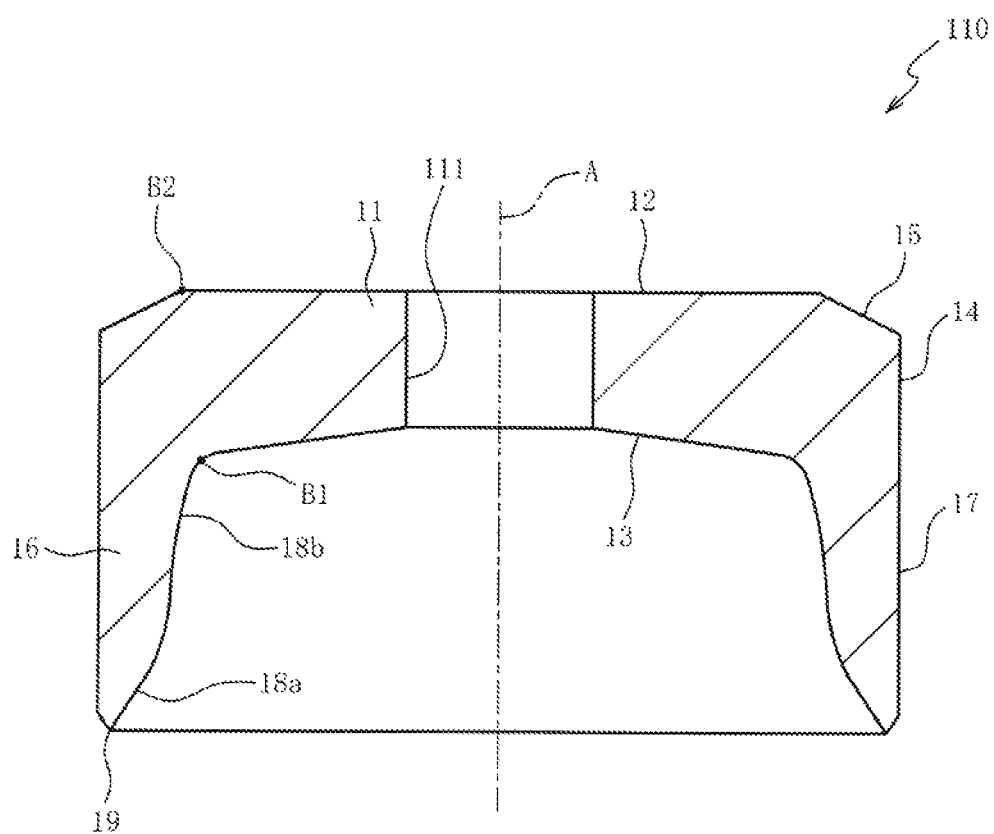
FIG. 10 is a cross-sectional view of a joining element illustrating a modification.

For example, as shown in FIG. 10, a joining element 110 provided with a through hole 111 located in the center in the radial direction of the body portion 11 may be formed. The joining element 110 is configured the same as the joining element 10 in the first embodiment except that the through hole 111 is formed in the body portion 11. The through hole 111 is open in the joining surface 12 and is open in the back surface 13 so as to communicate to the inside of the leg portion 16. An inside diameter of the through hole 111 is constant throughout in the axial direction of the virtual axis A and is smaller than an inside diameter of the leg portion 16. An inside diameter of the through hole 111 is set to the minimum dimension (for example, 2 mm or so) that can be formed during heading of the joining element 110. As a result, the joining element 110 provided with the through hole 111 can be formed by heading. Further, when the joining element 110 provided with the through hole 111 is welded to a mating member 2, an influence of the through hole 111 on formation of a melted portion 4 can be minimized.

The through hole 82, 94, 111 need not be open in the joining surface 12. A through hole may be open in the outer peripheral surface (the parallel portion 14 or the inclined portion 15, 32) of the body portion 11, 31, 63, 81, 93 or the outer peripheral surface 17, 35 of the leg portion 16, 34, 54, 83. As this opening position becomes closer to the joining surface 12, air can be made less prone to remain between the body portion 11, 31, 63, 81, 93 and the non-ferrous metal material 21 after press-fitting.

A through hole may be open in the inner circumferential surface (tip inner surface 18a, base inner surface 18b, first inner surface 84, or the like) of the leg portion 16, 34, 54, 83 as long as the through hole communicates to the inside of the leg portion 16, 34, 54, 83. As this opening position becomes closer to the back surface 13 or the boundary 87, 95, air can be made less prone to remain between the body portion 11, 31, 63, 81, 93 and the non-ferrous metal material 21 after press-fitting.

In the description of the seventh embodiment, a case where the entire back surface 103 of the body portion 11 is formed in the shape of convexity swelled to the opposite side to the joining surface 12 as it goes toward the center (virtual axis A) in the radial direction is taken as an example but the present invention is not limited to this. The body portion 31 in the second embodiment and the like may be provided with a back surface 103 in the shape of convexity. A part of the back surface of the body portion 11, 31 only has to be swelled toward the opposite side to the joining surface 12 relative to the surrounding area. For example, a convex portion including a flat plane perpendicular to a virtual axis A may be formed by swelling a part of the back surface of the body portion 11, 31 stepwise.

DESCRIPTION OF REFERENCE NUMERALS

1, 40, 50, 60, 70, 90, 100: joined body
2: mating member
4: melted portion
10, 30, 52, 62, 80, 92, 102, 110: joining element
11, 31, 63, 81, 93: body portion
12: joining surface
13, 103: back surface
14: parallel portion
15, 32: inclined portion
16, 34, 83: leg portion (lodging portion)
17, 35: outer peripheral surface (outer surface)
20, 41, 51, 61, 71, 91, 101: welding metal body
21, 42: non-ferrous metal material
22: front surface (predetermined surface)
54: leg portion
55: first outer surface (a part of the outer surface)
56: second outer surface (a part of the outer surface)
57, 65: lodging portion
82, 94, 111: through hole
A: virtual axis
B1, B2: boundary

What is claimed is:

1. A manufacturing method for a joined body obtained by joining together a mating member made of ferrous metal and a non-ferrous metal material having a predetermined surface facing to the mating member, comprising:
- a press fit step of press-fitting a joining element made of ferrous metal into the predetermined surface of the non-ferrous metal material; and
- a welding step of forming a melted portion between an exposed portion of the joining element press-fitted into the non-ferrous metal material and the mating member, the joining element before the press fit step comprising:
- a body portion including a joining surface in a shape of a flat plate orthogonal to a virtual axis, and an outer peripheral surface continuing to an outer peripheral edge of the joining surface and encircling the virtual axis; and
- at least one leg portion including an outer surface continuing to the outer peripheral surface of the body portion and protruded from an opposite side of the of the body portion to the joining surface so as to be positioned around the virtual axis and to be positioned away from the virtual axis, wherein the outer peripheral surface of the body portion is formed of at least one of:
- a parallel portion parallel to the virtual axis in a cross section including the vertical axis; and
- an inclined portion brought away from the virtual axis in a radial direction of the virtual axis as the inclined portion goes away from the joining surface in an axial direction of the virtual axis, the outer peripheral surface of the body portion is free from an inclined surface brought toward the virtual axis in the radial direction as the inclined surface goes away from the joining surface in the axial direction, wherein after the press fit step, a part of the joining element including the joining surface is exposed from the predetermined surface and the remaining part of the joining element is not exposed and is buried in the non-ferrous metal material, and wherein the remaining part of the joining element includes at least one lodging portion having a surface facing to the predetermined surface.

2. The manufacturing method for the joined body according to claim 1, comprising:
- a heating step of heating a portion of the non-ferrous metal material prior to the press fit step into which the joining element is press-fitted at the press fit step.

3. A welding metal body comprising:
- a non-ferrous metal material including a predetermined surface; and
- at least one joining element made of low-carbon steel with a carbon content of 0.4 mass % or less, the joining element comprising:
- a body portion including a joining surface in a shape of a flat plate orthogonal to a virtual axis, and an outer peripheral surface continuing to an outer peripheral edge of the joining surface and encircling the virtual axis; and
- at least one leg portion including an outer surface continuing to the outer peripheral surface of the body portion and protruded from an opposite side of the of the body portion to the joining surface so as to be positioned around the virtual axis and to be positioned away from the virtual axis, wherein the outer peripheral surface of the body portion is formed of at least one of:
- a parallel portion parallel to the virtual axis in a cross section including the vertical axis; and
- an inclined portion brought away from the virtual axis in a radial direction of the virtual axis as the inclined portion goes away from the joining surface in an axial direction of the virtual axis, the outer peripheral surface of the body portion is free from an inclined surface brought toward the virtual axis in the radial direction as the inclined surface goes away from the joining surface in the axial direction, wherein the joining element is press-fitted into the predetermined surface so that a part of the joining element including the joining surface is exposed from the predetermined surface and the remaining part of the joining element is not exposed and is buried in the non-ferrous metal material, and wherein the remaining part of the joining element includes at least one lodging portion having a surface facing to the predetermined surface.

4. A joining element press-fitted into a predetermined surface of a non-ferrous metal material and made of ferrous metal welded to a mating member made of ferrous metal, comprising:
- a body portion including a joining surface formed in the shape of a flat plate orthogonal to a virtual axis, and an outer peripheral surface continuing to an outer peripheral edge of the joining surface and encircling the virtual axis; and
- at least one leg portion including an outer surface continuing to the outer peripheral surface of the body portion and protruded from the opposite side of the body portion to the joining surface so as to be positioned around the virtual axis and to be positioned away from the virtual axis, wherein the outer peripheral surface of the body portion is formed of at least one of:
- a parallel portion parallel to the virtual axis in a cross section including the virtual axis; and
- an inclined portion brought away from the virtual axis in a radial direction of the virtual axis as the inclined portion goes away from the joining surface in an axial direction of the virtual axis, the outer peripheral surface of the body portion is free from an inclined surface brought toward the virtual axis in the radial direction as the inclined surface goes away from the joining surface in the axial direction.

5. The joining element according to claim 4,
wherein the outer peripheral surface of the body portion in a position where the outer surface of the leg portion continues includes the inclined portion continuing to an outer peripheral edge of the joining surface, the inclined portion brought away from the virtual axis in the radial direction as the inclined surface goes away from the joining surface in the axial direction.

6. The joining element according to claim 5,
wherein the body portion includes a back surface located on the opposite side to the joining surface and extended from the leg portion toward the virtual axis, and wherein a boundary between the inclined portion and the joining surface is located in a position farther from the virtual axis than a boundary between the back surface and the leg portion is.

7. The joining element according to claim 4,
wherein the leg portion is formed in the shape of a cylinder encircling the virtual axis from all around the virtual axis, and wherein a through hole open in at least one of the joining surface, the outer peripheral surface, and the outer surface communicates to the inside of the leg portion.

8. The joining element according to claim 4,
wherein the leg portion is formed in the shape of a cylinder encircling the virtual axis from all around the virtual axis,
wherein the body portion includes a back surface located on the opposite side to the joining surface and extended from the leg portion toward the virtual axis, and
wherein at least a part of the back surface is formed in the shape of convexity.

9. The joining element according to claim 4,
wherein the leg portion is in the shape of a cylinder encircling the virtual axis.

\* \* \* \* \*